United States Patent
Sasaki

(10) Patent No.: US 8,911,325 B2
(45) Date of Patent: Dec. 16, 2014

(54) GEAR RATIO CONTROL DEVICE, METHOD FOR CONTROLLING GEAR RATIO, AND VEHICLE

(75) Inventor: Akihiko Sasaki, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 384 days.

(21) Appl. No.: 13/370,307

(22) Filed: Feb. 10, 2012

(65) Prior Publication Data

US 2012/0252630 A1    Oct. 4, 2012

(30) Foreign Application Priority Data

Mar. 28, 2011  (JP) ................................ 2011-070651

(51) Int. Cl.
  *B60W 10/101*  (2012.01)
  *B60W 10/08*   (2006.01)
  *B60W 10/06*   (2006.01)
  *B60W 10/108*  (2012.01)
  *B60W 20/00*   (2006.01)
  *B60K 6/448*   (2007.10)
  *B60W 50/06*   (2006.01)
  *B60W 30/18*   (2012.01)
  *B60K 6/48*    (2007.10)
  *F16H 29/04*   (2006.01)

(52) U.S. Cl.
  CPC ............... *B60W 10/08* (2013.01); *B60W 10/06* (2013.01); *B60W 10/108* (2013.01); *B60W 20/00* (2013.01); *B60W 20/1088* (2013.01); *B60K 6/448* (2013.01); *B60W 50/06* (2013.01); *B60W 30/18027* (2013.01); *B60K 2006/4808* (2013.01); *B60W 20/40* (2013.01); *B60W 2710/0677* (2013.01); *B60W 2710/1005* (2013.01); *F16H 29/04* (2013.01); *Y02T 10/6286* (2013.01); *Y02T 10/626* (2013.01); *Y02T 10/6243* (2013.01)
  USPC .......................................... 477/115; 475/170

(58) Field of Classification Search
  USPC .......................................... 475/169, 170, 172
  See application file for complete search history.

(56) References Cited

U.S. PATENT DOCUMENTS 7,108,626 B2 * 9/2006 Friedmann ....................... 475/8

FOREIGN PATENT DOCUMENTS

| JP | 2005-502543 | 1/2005 |
| JP | 2009-234292 | 10/2009 |
| JP | 2010-083351 | 4/2010 |
| JP | 2011-020541 | 2/2011 |

OTHER PUBLICATIONS

Japanese Office Action for corresponding JP Application No. 2011-070651, Sep. 10, 2013.
Japanese Office Action for corresponding JP Application No. 2011-070651, Jan. 22, 2013.

* cited by examiner

Primary Examiner — Robert A Siconolfi
Assistant Examiner — Huan Le
(74) Attorney, Agent, or Firm — Mori & Ward, LLP

(57) ABSTRACT

A gear ratio control device includes a controller configured to control gear ratio in a vehicle. The controller is configured to adjust an eccentricity of first supporting points of the eccentric discs so that, in the event of starting a power source in a state in which the power source is stopped and the vehicle is traveling, the gear ratio at a continuously variable transmission is at a target value, in parallel with performing start control of the power source.

12 Claims, 11 Drawing Sheets

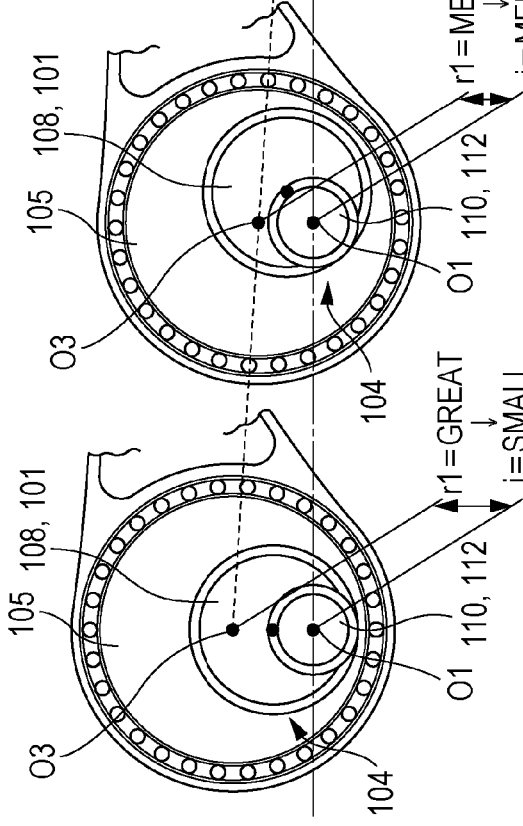
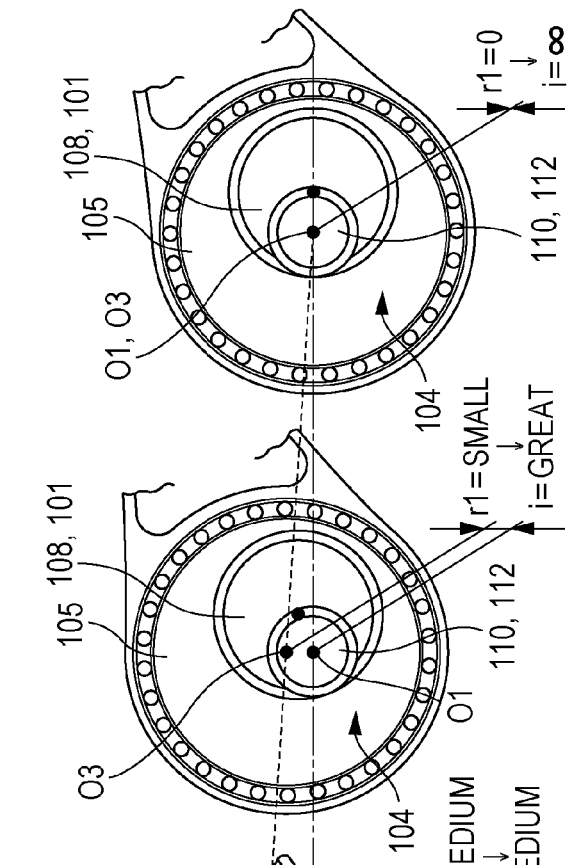

US 8,911,325 B2

GEAR RATIO CONTROL DEVICE, METHOD FOR CONTROLLING GEAR RATIO, AND VEHICLE

CROSS-REFERENCE TO RELATED APPLICATIONS

The present application claims priority under 35 U.S.C. §119 to Japanese Patent Application No. 2011-070651, filed Mar. 28, 2011, entitled "Gear Ratio Control Device and Gear Ratio Control Method". The contents of this application are incorporated herein by reference in their entirety.

BACKGROUND OF THE INVENTION

1. Field of the Invention

The present invention relates to a gear ratio control device, a method for controlling gear ratio, and a vehicle.

2. Discussion of the Background

As described in Japanese Unexamined Patent Application Publication (Translation of PCT Application) No. 2005-502543, there is known, as a conventional automobile drive system, a hybrid type drive system configured such that an engine and transmission and motor generator are combined, with a drive shaft of the transmission and a driven shaft are connected by an eccentric member driving device provided to the drive shaft and a one-way clutch provided to the driven shaft, so that output of the engine is supplied to the drive shaft of the transmission. Also, the motor generator is selectively connectable to the input side of the transmission or the output side of the one-way clutch via a clutch, or simultaneously connectable to the input side of the transmission and the output side of the one-way clutch.

With this drive system, engine driving using just the driving force of the engine, EV (electric vehicle) driving using just the driving force of the motor generator, and parallel driving using both the driving force of the engine and the driving force of the motor generator, can be performed. Note that the engine can be started with the motor generator.

The transmission used with this drive system is a continuously variable transmission called IVT (Infinity Variable Transmission) of a type which converts rotational motion of a drive shaft into oscillating motion, and further converts the oscillating motion into rotational motion which is output from a driven shaft. With transmissions of this type, the gear ratio can be changed nonstop without using a clutch, and the maximum value of the gear ratio can be set to infinity. Note that with this transmission, the number of output revolutions when the gear ratio is set to infinity is zero.

FIG. 6 is a side cross-sectional view of the configuration of a portion of a continuously variable transmission called an IVT, viewed from the axial direction. The continuously variable transmission in FIG. 6 includes an input shaft 101, which rotates on an input center axial line O1 under rotational force from a power source such as an internal combustion engine or the like, an eccentric disc 104 integrally rotating with the input shaft 101, a linking member 130 to connect the input side and output side, and a one-way clutch 120 provided on the output side.

The eccentric disc 104 is formed circularly with a first support point O3 as the center. The first support points O3 are provided at equal intervals in the circumferential direction of the input shaft 101, the eccentricity r1 of each as to the input center axial line O1 being changeable, so as to rotate around the input center axial line O1 along with the input shaft 101 while maintaining the eccentricity r1. Accordingly, the eccentric disc 104 is provided so as to eccentrically rotate around the input center axial line O1 in accordance with the rotation of the input shaft 101, while each maintaining the eccentricity r1.

As shown in FIG. 6, the eccentric disc 104 is configured of an outer circumference side disc 105, and an inner circumference side disc 108 which is integrally formed with the input shaft 101. The inner circumference side disc 108 is formed as a thick disc, with the center thereof displaced by a certain eccentric distance as to the input center axial line O1 which is the center axial line of the input shaft 101. The outer circumference side disc 105 is formed as a thick disc centered on the first support point O3, and has a first circular hole 106 of which the center is away from the center of the outer circumference side disc 105, i.e., away from the first support point O3. The outer circumference of the inner circumference side disc 108 rotatably fits with the inner circumference of the first circular hole 106.

Also, a second circular hole 109 is formed to the inner circumference side disc 108, being centered on the input center axial line O1 and having a portion in the circumferential direction thereof opened to the outer circumference of the inner circumference side disc 108. A pinion 110 is rotatably contained within the second circular hole 109. The teeth of the pinion 110 mesh with an annular gear 107 formed on the inner circumference of the first circular hole 106 of the outer circumference side disc 105, through the opening on the outer circumference of the second circular hole 109.

This pinion 110 is provided so as to rotate coaxially with the input center axial line O1 which is the center axial line of the input shaft 101. That is to say, the center of rotation of the pinion 110 and the input center axial line O1 which is the center axial line of the input shaft 101 match. The pinion 110 is rotated within the second circular hole 109 by an unshown actuator configured of a DC motor and a reducer. Normally, the pinion 110 is rotated synchronously with the rotation of the input shaft 101, and with the synchronized revolutions as a reference, the pinion 110 is caused to rotate relative to the input shaft 101 by providing the pinion 110 with revolutions greater than or less than the revolutions of the input shaft 101. For example, this is realized by the pinion 110 and output shaft of the actuator being situated so as to be mutually linked, and in the event that there is rotational difference between the rotations of the actuator as to the rotations of the input shaft 101, a reducer (e.g., a planetary gear) is used whereby the relative angle between the input shaft 101 and the pinion 110 changes by an amount equivalent to the rotational difference multiplied by the ratio of reduction. At this time, in the event that the actuator and the input shaft 101 are synchronized with no rotational difference, the eccentricity r1 does not change.

Accordingly, by turning the pinion 110, the annular gear 107 with which the teeth of the pinion 110 mesh, i.e., the outer circumference side disc 105, rotates relative to the inner circumference side disc 108, whereby the distance between the center of the pinion 110 (input center axial line O1) and the center of the outer circumference side disc 105 (first support point O3), i.e., the eccentricity of the eccentric disc 104 changes.

Settings have been made such that, in this case, the center of the outer circumference side disc 105 (first support point O3) can be made to match with the center of the pinion 110 (input center axial line O1) by rotating the pinion 110, and by matching these centers, the eccentricity r1 of the eccentric disc 104 can be set to zero.

Also, the one-way clutch 120 includes an output member (clutch inner) 121 which rotates around an output center axial line O2 which is away from the input center axial line O1, a ring-shaped input member (clutch outer) 122 which oscillates around the output center axial line O2 upon external force in the rotational direction be applied thereupon, multiple rollers (engaging units) 123 inserted between the input member 122 and output member 121 to place the input member 122 and the output member 121 in a mutually locked state or unlocked state. Note that rollers 123 of a number equal as the number of cross-sectional sides of the output member 121 are provided to the one-way clutch.

Transmission of power (torque) from the input member 122 of the one-way clutch 120 to the output member 121 thereof is performed only under the condition that the rotational speed of the of the input member 122 in the positive direction (e.g., the direction indicated by arrow RD1 in FIG. 6) exceeds the rotational speed of the output member 121 in the positive direction. That is to say, only in the event that the rotational speed of the input member 122 exceeds the rotational speed of the output member 121, does meshing (locking) occur via the rollers 123, and the oscillating motion of the input member 122 is converted into rotational motion of the output member 121.

One protruding portion 124 is provided in the circumferential direction on the ring-shaped input member 122, with a second supporting point O4 distanced from the output center axial line O2 being provided to the protruding portion 124. A pin 125 is situated on the second supporting point O4 of each input member 122, and a tip (other end portion) 132 of the linking member 130 is rotatably linked to the input member 122 by the pin 125.

The linking member 130 has a ring portion 131 at one end side, with the inner circumference of a circular opening 133 of the ring portion 131 rotatably fitting the outer circumference of the eccentric disc 104 via a bearing 140.

Accordingly, one end of the linking member 130 is rotatably linked to the outer circumference of the eccentric disc 104, and the other end of the linking member 130 is rotatably linked to the second supporting point O4 provided on the input member 122 of the one-say clutch 120, whereby a four-bar linkage mechanism, with the four joints of input center axial line O1, first support point O3, output center axial line O2, and second supporting point O4 serving as turning points being, is configured as shown in FIG. 7.

FIG. 7 is an explanatory diagram of the driving force transmission principle of the continuously variable transmission configured as a four-bar linkage mechanism. With this four-bar linkage mechanism, rotational motion provided form the input shaft 101 to the eccentric disc 104 is transmitted to the input member 122 of the one-way clutch 120 as oscillating motion of this input member 122, and the oscillating motion of the input member 122 is converted into rotational motion of the output member 121. When the input shaft 101 rotating the eccentric disc 104 makes one rotation, the input member 122 of the one-way clutch 120 makes one reciprocal oscillation. The oscillation cycle of the input member 122 of the one-way clutch 120 is constant, regardless of the value of the eccentricity r1 of the eccentric disc 104, as shown in FIG. 7. The angular speed ω2 of the input member 122 is determined by the rotational angular speed ω1 of the eccentric disc 104 (input shaft 101) and eccentricity r1.

At this time, the eccentricity r1 of the eccentric disc 104 can be changed by moving, with the actuator, the pinion 110 of a variable gear ratio mechanism 112, configured of the pinion 110, the inner circumference side disc 108 having the second circular hole 109 containing the pinion 110, the outer circumference side disc 105 having the first circular hole 106 for rotatably containing the inner circumference side disc 108 and the actuator, and so forth. By changing the eccentricity r1, the oscillation angle θ2 of the input member 122 of the one-way clutch 120 can be changed, and accordingly, the ratio of revolutions (gear ratio, also written as "ratio i") of the output member 121 as to the rotations of the input shaft 101 can be changed. That is to say, by adjusting the eccentricity r1 of the first support point O3 as to the input center axial line O1, the oscillation angle θ2 of the oscillation motion transmitted from the eccentric disc 104 to the input member 122 of the one-way clutch 120 is changed, whereby the gear ratio at the time of the rotational force input to the input shaft 101 being transmitted to the output member 121 of the one-way clutch 120 as rotational force via the eccentric disc 104 and linking members 130 can be changed.

FIGS. 8A through 9C are explanatory diagrams of a transmission principle with the variable gear ratio mechanism 112 at the continuously variable transmission shown in FIG. 6. As shown in FIGS. 8A through 9C, the eccentricity r1 of the eccentric disc 104 as to the input center axial line O1 (center of rotation of the pinion 110) can be adjusted by rotating the pinion 110 of the variable gear ratio mechanism 112 to rotate the outer circumference side disc 105 as to the inner circumference side disc 108.

For example, as shown in FIGS. 8A and 9A, in the event that the eccentricity r1 of the eccentric disc 104 is set to "great", the oscillation angle θ2 of the input member 122 of the one-way clutch 120 can be made greater, so a small gear ratio i can be realized. Also, as shown in FIGS. 8B and 9B, in the event that the eccentricity r1 of the eccentric disc 104 is set to "medium", the oscillation angle θ2 of the input member 122 of the one-way clutch 120 can be set to "medium", so a medium level gear ratio i can be realized. Further, as shown in FIGS. 8C and 9C, in the event that the eccentricity r1 of the eccentric disc 104 is set to "small", the oscillation angle θ2 of the input member 122 of the one-way clutch 120 can be made smaller, so a great gear ratio i can be realized. Moreover, as shown in FIG. 8D, in the event that the eccentricity r1 of the eccentric disc 104 is set to "zero", the oscillation angle θ2 of the input member 122 of the one-way clutch 120 can be set to "zero", so a gear ratio i of infinity ($\infty$) can be realized.

The oscillation cycle of the input member 122 of the one-way clutch 120 is constant, regardless of the value of the eccentricity r1 of the eccentric disc 104, as shown in FIG. 10. FIG. 6 is a side cross-sectional view and accordingly only illustrates one set of the eccentric disc 104, linking member 130, and one-way clutch 120, but multiple sets of these are arrayed along the input center axial line O1 with an IVT. Note however, that each eccentric disc 104 in each set is formed with a circular form centered on a first support point O3, and the first support points O3 are arrayed at equal intervals in the circumferential direction around the input center axial line O1. Accordingly, the eccentric discs 104 perform eccentric rotation around the input center axial line O1 while maintaining the eccentricity r1, so oscillating motion brought about at the input member 122 of the one-way clutch 120 by the rotational motion of the eccentric discs 104 occurs in order with a certain phase, as shown in FIG. 11.

After driving by one linking member 130 has ended, the rotational speed of the input member 122 drops below the rotational speed of the output member 121, and also the locking by the rollers 123 is disengaged by the driving force of another linking member 130, thus returning to a free state (spinning state). By this being performed by all of the linking members 130 in order, the oscillating motion is converted into one-directional rotational motion. Accordingly, only the force of the input member 122 at a timing at which the rotational speed of the output member 121 is exceeded is transmitted to the output member 121 in order, and rotational force smoothed to being nearly flat is provided to the output member 121.

SUMMARY OF THE INVENTION

According to one aspect of the present invention, a gear ratio control device includes a controller configured to control gear ratio in a vehicle including a continuously variable transmission having a four-bar linkage mechanism. The continuously variable transmission includes an input shaft, eccentric discs, a one-way clutch, linking members, and a variable gear ratio mechanism. The input shaft is to rotate on an input center axial line by receiving rotational force from a power source. The eccentric discs each have a first supporting point of which eccentricity as to the input center axial line is changeable as a center of the eccentric disc. Each of the eccentric discs is rotatable around the input center axial line while maintaining the eccentricity. The one-way clutch includes an output member, an input member, and an engaging member. The output member is to rotate around an output center axial line which is distanced from the input center axial line. The input member is to oscillate around the output center axial line by receiving external rotational force. The engaging member is to place the input member and the output member into a mutually locked state or unlocked state. The one-way clutch is configured so that, in the event that positive rotational speed of the input member exceeds positive rotational speed of the output member, the rotational force input to the input member is transmitted to the output member, to convert oscillating motion of the input member into rotational motion of the output member. The linking members each include a first end and a second end. The first end is rotatably linked to a perimeter of the eccentric disc centered on the first supporting point. The second end is rotatably linked to a second supporting point provided on the input member of the one-way clutch at a position distanced from the output center axial line, so that rotational motion provided from the input shaft to the eccentric discs is transmitted to the input member of the one-way clutch as oscillating motion of the input member. The variable gear ratio mechanism includes an actuator to change an oscillation angle of oscillating motion transmitted from the eccentric discs to the input member of the one-way clutch by adjusting the eccentricity of the first supporting points as to the input center axial line. The continuously variable transmission is provided to change the gear ratio at the time of the rotational force input to the input shaft being transmitted as rotational force to the output member of the one-way clutch via the eccentric discs and the linking members. The variable gear ratio mechanism is configured so that the eccentricity can be set to zero, to enable the gear ratio to be set to infinity. The controller is configured to adjust the eccentricity so that, in the event of starting the power source in a state in which the power source is stopped and the vehicle is traveling, the gear ratio at the continuously variable transmission is at a target value, in parallel with performing start control of the power source.

According to another aspect of the present invention, a method is for controlling gear ratio in a vehicle including continuously variable transmission having a four-bar linkage mechanism. The continuously variable transmission includes an input shaft, eccentric discs, a one-way clutch, linking members, and a variable gear ratio mechanism. The input shaft is to rotate on an input center axial line by receiving rotational force from a power source. The eccentric discs each have a first supporting point of which eccentricity as to the input center axial line is changeable as a center of the eccentric disc. Each of the eccentric discs is rotatable around the input center axial line while maintaining the eccentricity. The one-way clutch includes an output member, an input member, and an engaging member. The output member is to rotate around an output center axial line which is distanced from the input center axial line. The input member is to oscillate around the output center axial line by receiving external rotational force. The engaging member is to place the input member and the output member into a mutually locked state or unlocked state. The one-way clutch is configured so that, in the event that positive rotational speed of the input member exceeds positive rotational speed of the output member, the rotational force input to the input member is transmitted to the output member, to convert oscillating motion of the input member into rotational motion of the output member. The linking members each include a first end and a second end. The first end is rotatably linked to a perimeter of the eccentric disc centered on the first supporting point. The second end is rotatably linked to a second supporting point provided on the input member of the one-way clutch at a position distanced from the output center axial line, so that rotational motion provided from the input shaft to the eccentric discs is transmitted to the input member of the one-way clutch as oscillating motion of the input member. The variable gear ratio mechanism includes an actuator to change an oscillation angle of oscillating motion transmitted from the eccentric discs to the input member of the one-way clutch by adjusting the eccentricity of the first supporting points as to the input center axial line. The continuously variable transmission is provided to change the gear ratio at the time of the rotational force input to the input shaft being transmitted as rotational force to the output member of the one-way clutch via the eccentric discs and the linking members. The variable gear ratio mechanism is configured so that the eccentricity can be set to zero, to enable the gear ratio to be set to infinity. The method includes adjusting the eccentricity so that, in the event of starting the power source in a state in which the power source is stopped and the vehicle is traveling, the gear ratio at the continuously variable transmission is at a target value, in parallel with performing start control of the power source.

According to further aspect of the present invention, a vehicle includes a continuously variable transmission and a gear ratio control device. The continuously variable transmission has a four-bar linkage mechanism. The continuously variable transmission includes an input shaft, eccentric discs, a one-way clutch, linking members, and a variable gear ratio mechanism. The input shaft is to rotate on an input center axial line by receiving rotational force from a power source. The eccentric discs each have a first supporting point of which eccentricity as to the input center axial line is changeable as a center of the eccentric disc. Each of the eccentric discs is rotatable around the input center axial line while maintaining the eccentricity. The one-way clutch includes an output member, an input member, and an engaging member. The output member is to rotate around an output center axial line which is distanced from the input center axial line. The input member is to oscillate around the output center axial line by receiving external rotational force. The engaging member is to place the input member and the output member into a mutually locked state or unlocked state. The one-way clutch is configured so that, in the event that positive rotational speed of the input member exceeds positive rotational speed of the output member, the rotational force input to the input member is transmitted to the output member, to convert oscillating motion of the input member into rotational motion of the output member. The linking members each include a first end and a second end. The first end is rotatably linked to a perimeter of the eccentric disc centered on the first supporting point. The second end is rotatably linked to a second supporting point provided on the input member of the one-way clutch at a position distanced from the output center axial line, so that rotational motion provided from the input shaft to the eccentric discs is transmitted to the input member of the one-way clutch as oscillating motion of the input member. The variable gear ratio mechanism includes an actuator to change an oscillation angle of oscillating motion transmitted from the eccentric discs to the input member of the one-way clutch by adjusting the eccentricity of the first supporting points as to the input center axial line. The continuously variable transmission is provided to change the gear ratio at the time of the rotational force input to the input shaft being transmitted as rotational force to the output member of the one-way clutch via the eccentric discs and the linking members. The gear ratio control device is configured to control gear ratio in the vehicle. The gear ratio control device is configured to adjust the eccentricity, in the event of starting the power source in a state in which the power source is stopped and the vehicle is traveling, so that the gear ratio at the continuously variable transmission is at a target value, in parallel with performing start control of the power source.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 8A through 8D are explanatory diagrams of the principle of shifting with a variable gear ratio mechanism in the continuously variable transmission shown in FIG. 6.

DESCRIPTION OF THE EMBODIMENTS

Figure 1:
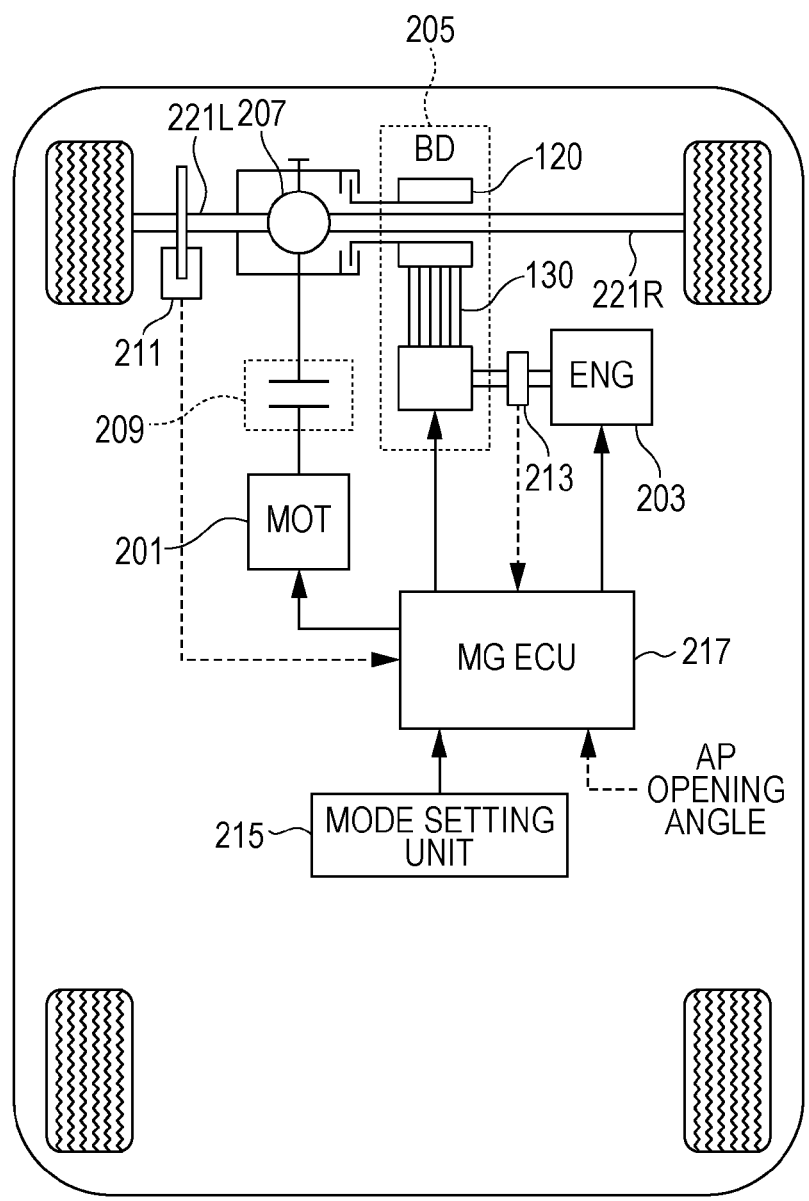
FIG. 1 is a block drawing illustrating the internal configuration of a parallel type HEV.

The embodiments will now be described with reference to the accompanying drawings, wherein like reference numerals designate corresponding or identical elements throughout the various drawings.

An embodiment of the gear ratio control device and a gear ratio control method according to the present disclosure will be described with reference to the drawings. Note that a continuously variable transmission called an IVT (Infinity Variable Transmission), which may be referred to simply as "BD" hereinafter, is used with the gear ratio control device described below, which controls the gear ratio i by adjusting eccentricity r1 at the continuously variable transmission. Also, the power source at the input side of the continuously variable transmission will be described as being an internal combustion engine which is the driving source of the vehicle with the following description. With the present embodiment, the output of the internal combustion engine is input to the continuously variable transmission without change. Also, an electric motor serving as the driving source of the vehicle is provided at the output side of the continuously variable transmission via a clutch.

The gear ratio control device according to the present embodiment is installed in an HEV (Hybrid Electrical Vehicle). An HEV has both an electric motor and an internal combustion engine, and drives under the driving force of the electric motor and/or the internal combustion engine depending on the driving state of the car. There are generally two types of HEVs; series type and parallel type. A series type HEV drives with the power of the electric motor. The internal combustion engine is used only for generating electricity, and electric power generated at a generator due to the power from the internal combustion engine is either charged to a battery or supplied to the electric motor.

A parallel type HEV drives with the power of one or both of the electric motor and internal combustion engine. A state of driving using only the driving force of the electric motor is referred to as "EV driving", a state of driving using only the driving force of the internal combustion engine is referred to as "engine driving", and state of driving using the driving force of both the electric motor and the internal combustion engine is referred to as "parallel driving".

There is also known a series/parallel type HEV with the above types combined. With this type, the transmission system for driving force is switched to one or the other of series type and parallel type by engaging or disengaging a clutch depending on the driving state of the vehicle. Particularly, the clutch is disengaged to have a series type configuration when driving at low speeds, and the clutch is engaged to have a parallel type configuration when driving at mid-to-high speeds.

FIG. 1 is a block diagram illustrating the internal configuration of a parallel type HEV. As shown in FIG. 1, the parallel type HEV (hereinafter referred to simply as "vehicle") has an electric motor (MOT) 201, an internal combustion engine (ENG) 203, a four-bar linkage mechanism continuously variable transmission (hereinafter also referred to simply as "BD") 205 described in the BACKGROUND and the SUMMARY, a differential gear 207, a clutch 209, a vehicle speed sensor 211, a revolutions sensor 213, a mode selecting unit 215, and a management ECU (MG ECU) 217, and configures the gear ratio control device according to the present embodiment. Note that the dotted arrows in FIG. 1 indicate value data, and the solid lines indicate control signals including command contents.

The electric motor 201 generates force for the vehicle to drive. The output of the electric motor 201 is transmitted to axles 221L and 221R by the clutch 209 and differential gear 207. The internal combustion engine 203 generates force for the vehicle to drive. The output of the internal combustion engine 203 is input to the BD 205.

The differential gear 207 distributes the driving force transmitted from the electric motor 201 and/or internal combustion engine 203 to the axles 221L and 221R on the left and right sides of the vehicle. The clutch 209 opens and closes the driving force transmission path from the electric motor 201 to the differential gear 207. The clutch 209 is controlled by the management ECU 217.

The vehicle speed sensor 211 detects the driving speed (vehicle speed) of the vehicle. Signals indicating the vehicle speed detected by the vehicle speed sensor 211 are sent to the management ECU 217. The revolutions sensor 213 detects revolutions Ne of the internal combustion engine 203 (input revolutions to the BD 205).

The mode selecting unit 215 notifies which of the multiple modes relating to driving of the vehicle that the driver has selected, to the management ECU 217. The two modes of normal drive mode and power priority mode are provided with the vehicle according to the present embodiment. Normal drive mode is a general purpose driving mode, while the power priority mode is a mode in which the driver can use the high RPM range of the internal combustion engine 203 to enjoy sports driving and so forth.

The management ECU 217 performs central control of the electric motor 201, internal combustion engine 203, BD 205, and so forth. Also, the management ECU 217 receives input of signals from the vehicle speed sensor 211 (signals indicating the vehicle speed), signals from the revolutions sensor 213 (signals indicating the revolutions Ne of the internal combustion engine 203), signals indicating the opening angle of the accelerator pedal (AP opening angle) operated by the driver, and signals indicating the mode selected by the mode selecting unit 215. Upon determining while the vehicle is in EV driving that the internal combustion engine 203 needs to be started, based on the AP opening angle and the vehicle speed, the management ECU 217 performs processing based on the mode selected at the mode selecting unit 215.

Figure 2:
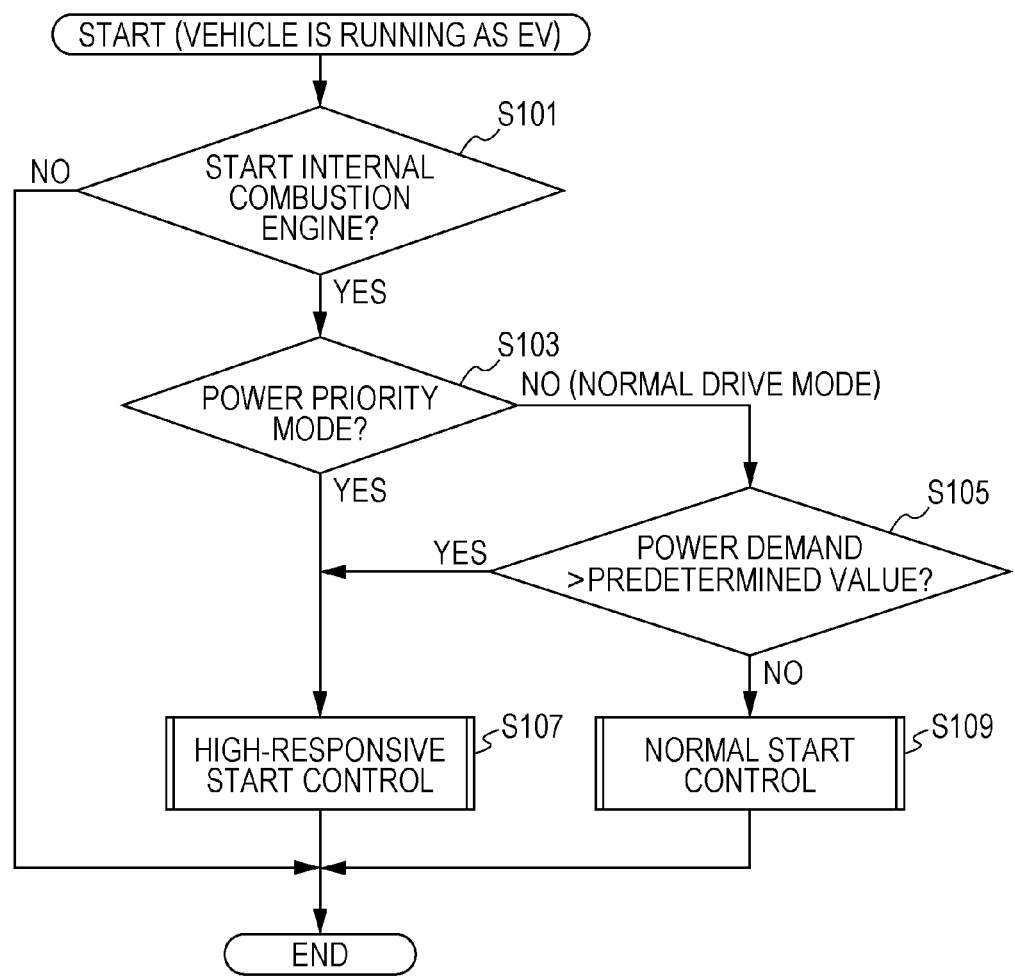
FIG. 2 is a flowchart illustrating the operations of a management ECU which the HEV shown in FIG. 1 has.

FIG. 2 is a flowchart illustrating the operations of the management ECU 217 which the HEV shown in FIG. 1 has. As shown in FIG. 2, while the vehicle is in EV driving, the management ECU 217 determines whether or not the internal combustion engine 203 needs to be started, based on the AP opening angle and the vehicle speed (step S101). In the event that determination is made by the management ECU 217 in step S101 that the internal combustion engine 203 needs to be started, the flow advances to step S103. In step S103, the management ECU 217 determines whether or not the mode selected by the mode selecting unit 215 is the power priority mode. In the event that the mode is not the power priority mode, i.e., in the event that the mode is the normal drive mode, the flow advances to step S105, and in the event that the mode is the power priority mode the flow advances to step S107.

In step S105, the management ECU 217 determines whether or not the requested output obtained based on the AP opening angle and vehicle speed is greater than a predetermined value, i.e., whether or not requested output>predetermined value holds, and in the event that this is the case, the flow advances to step S107. On the other hand, if the event that this is not the case, i.e., in the event that requested output≤predetermined value holds, the flow advances to step S109.

In step S107, the management ECU 217 performs control for high-response start of the internal combustion engine 203. Details of this high-response start control will be described later with reference to FIG. 4.

On the other hand, in step S109, the management ECU 217 performs control for starting the internal combustion engine 203 with a conventionally-used method. Details of this normal start control will be described later with reference to FIG. 5.

In the above-described flowchart, in the event that the management ECU 217 determines in step S101 that there is no need to start the internal combustion engine 203, or upon the processing of step S107 or step S109 ending, the management ECU 217 ends the processing of the main routine shown in FIG. 2.

Figure 3:
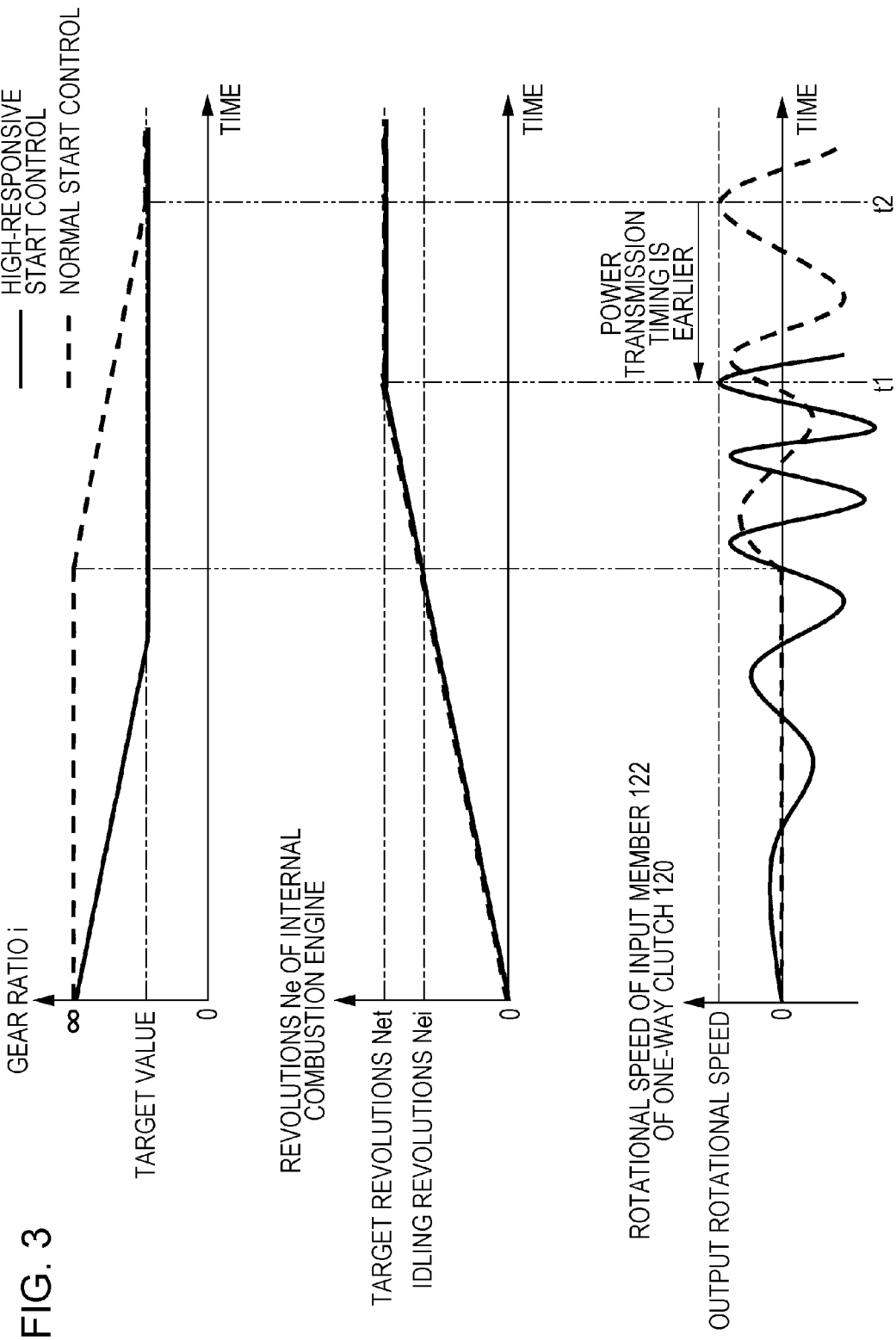
FIG. 3 is a graph illustrating change in each of change ratio i at a continuously variable transmission, revolutions of an internal combustion engine, and change in oscillating motion of an input member of a one-way clutch configuring the IVT, for high response start control and normal start control of the internal combustion engine.

FIG. 3 is a graph illustrating change in each of change ratio i at the BD 205, revolutions Ne of the internal combustion engine 203, and change in oscillating motion of the input member 122 of the one-way clutch 120 configuring the BD 205, for high response start control and normal start control of the internal combustion engine 205. Note that in FIG. 3, the solid lines represent change under high-response start control, and the dotted lines represent change under normal start control. In this graph, the vehicle is traveling at a constant speed.

Figure 4:
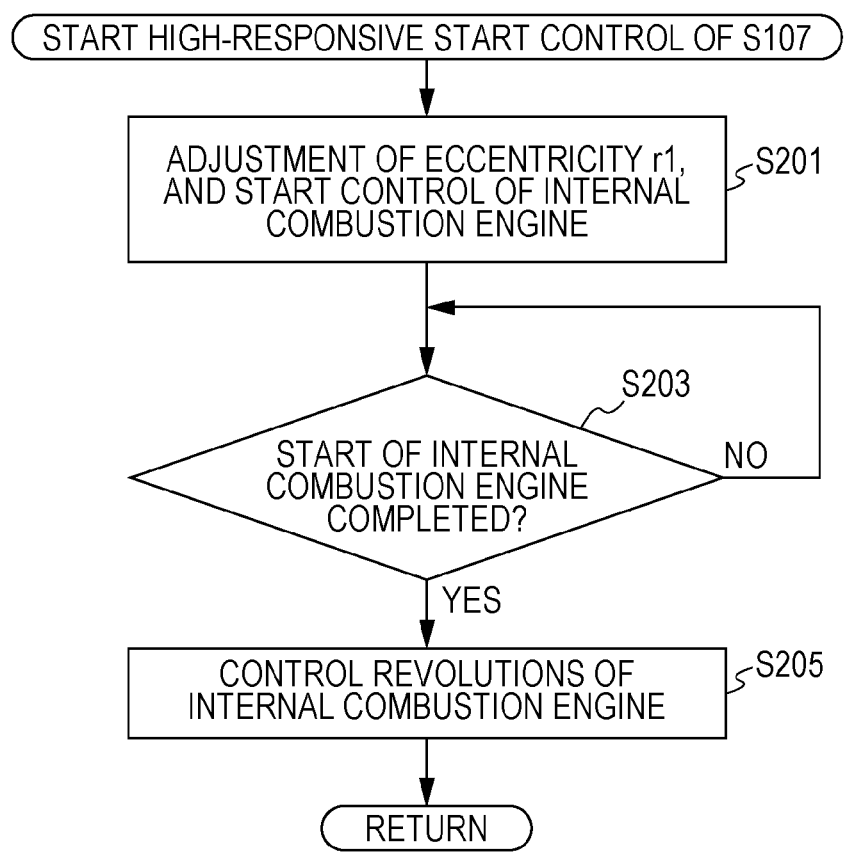
FIG. 4 is a flowchart illustrating operations of the management ECU at the time of high response start control of the internal combustion engine.

The operations of the management ECU 217 at the time of high-response start control will be described with reference to FIGS. 3 and 4. FIG. 4 is a flowchart illustrating the operations of the management ECU 217 when performing high-response start control of the internal combustion engine 203. As shown in FIG. 4, in step S201 the management ECU 217 performs adjustment of the eccentricity r1 at the BD 205 such that the gear ratio i approaches the target value, and start control of the internal combustion engine 203, at the same time. Note that the eccentricity r1 corresponding to the target value for the gear ratio i is a value which the management ECU 217 calculates based on the AP opening angle, vehicle speed, and target revolutions Net of the internal combustion engine 203.

Next, in step S203 the management ECU 217 determines whether or not starting of the internal combustion engine 203 has been completed, in accordance with whether or not the revolutions Ne of the internal combustion engine 203 have reached revolutions Nei enabling idling (hereinafter referred to as "idling revolutions"). If determination is made in step S203 that revolutions Ne of the internal combustion engine 203 have reached revolutions Nei, determination is made that starting of the internal combustion engine 203 has been completed, and the flow advances to step S205. Otherwise, the flow loops back to step S203.

In step S205, the management ECU 217 controls the internal combustion engine 203 such that the revolutions Ne of the internal combustion engine 203 are the target revolutions Net according to the requested output. Note that the target revolutions Net are preferably revolutions of a driving point on a line connecting driving points at which the fuel consumption rate of the internal combustion engine 203 is most efficient (BSFC (Brake Specific Fuel Consumption) bottom line). Also, in step S205, in the event that the gear ratio i has not reached the target value by adjustment of the eccentricity r1 in step S201, the management ECU 217 may continue the eccentricity r1 from step S201 on.

Figure 5:
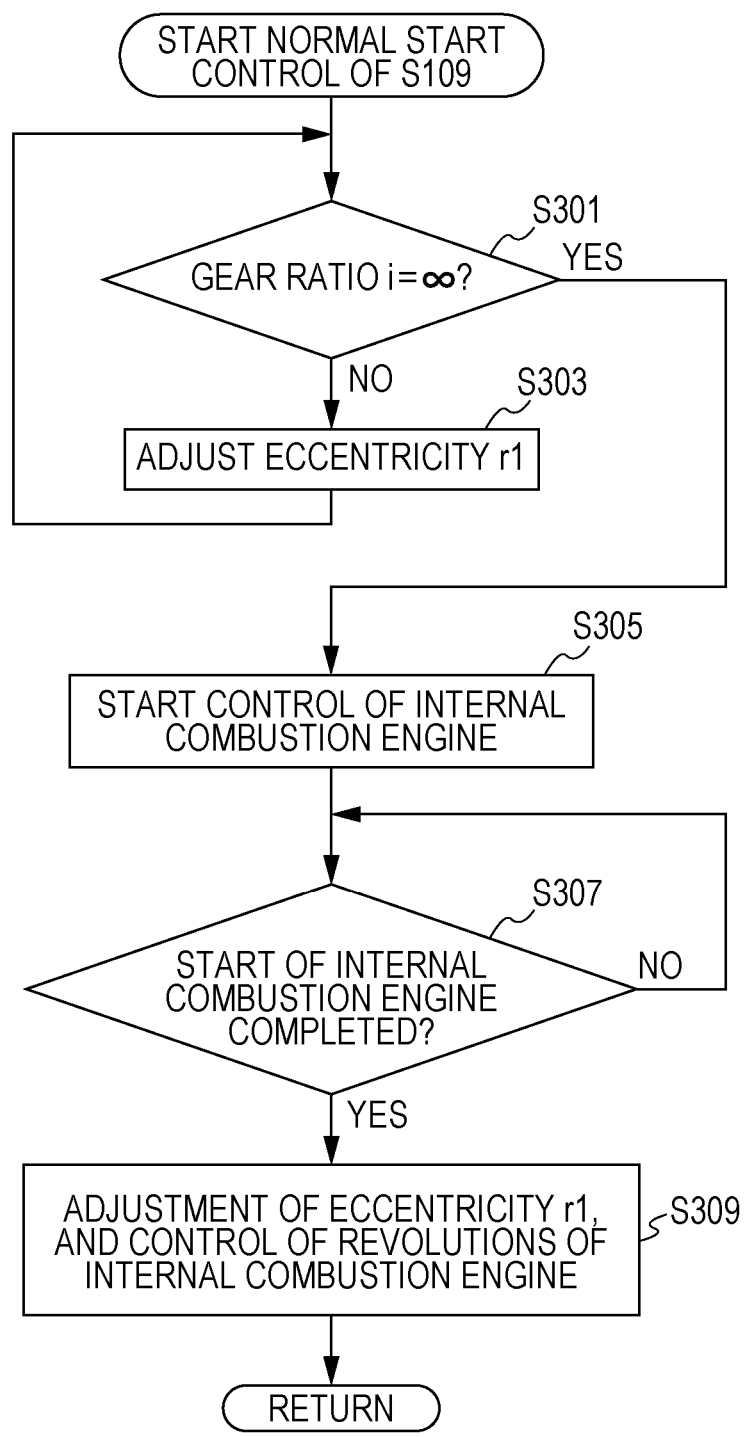
FIG. 5 is a flowchart illustrating the operations of the management ECU at the time of normal start control of the internal combustion engine.
Figure 6:
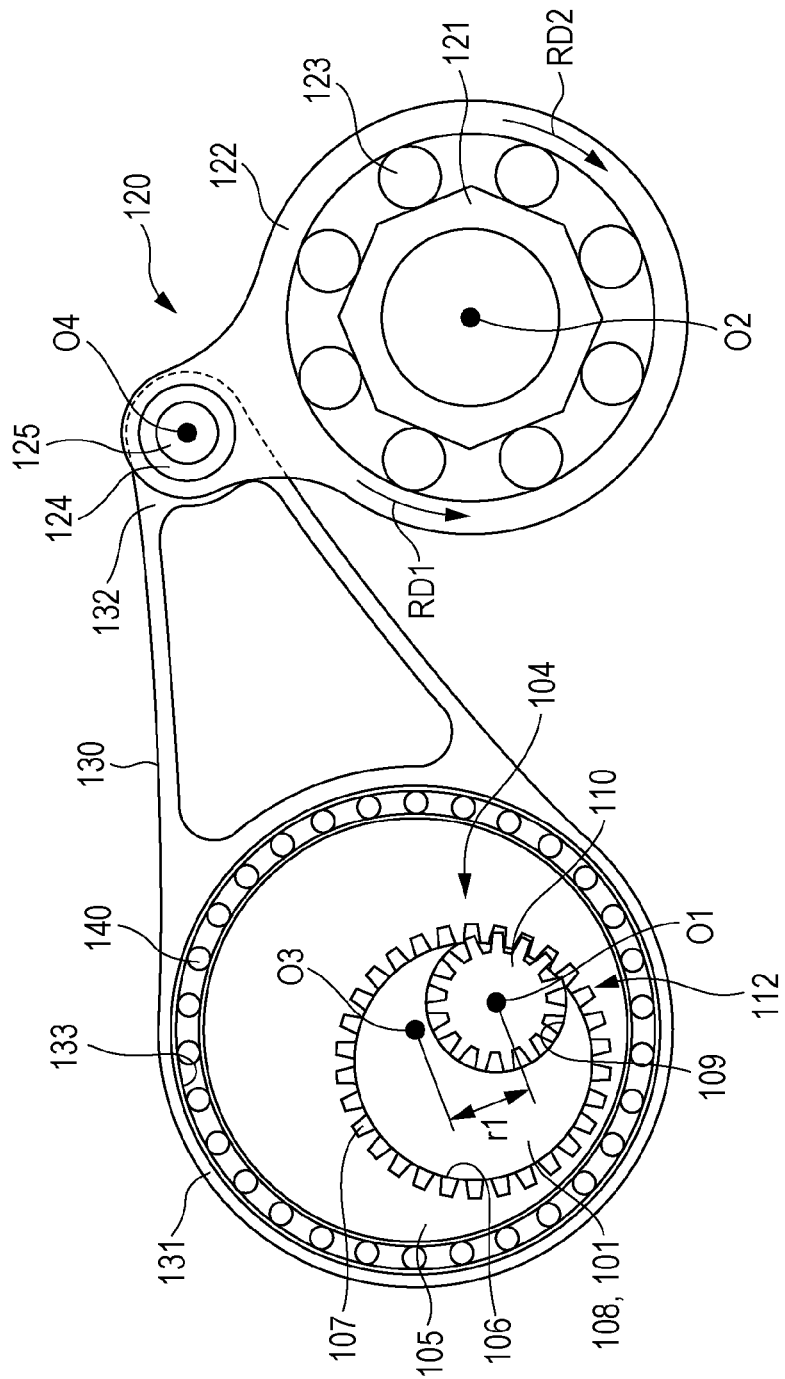
FIG. 6 is a side cross-sectional view of the configuration of part of a continuously variable transmission called an IVT, from the axial line direction.
Figure 7:
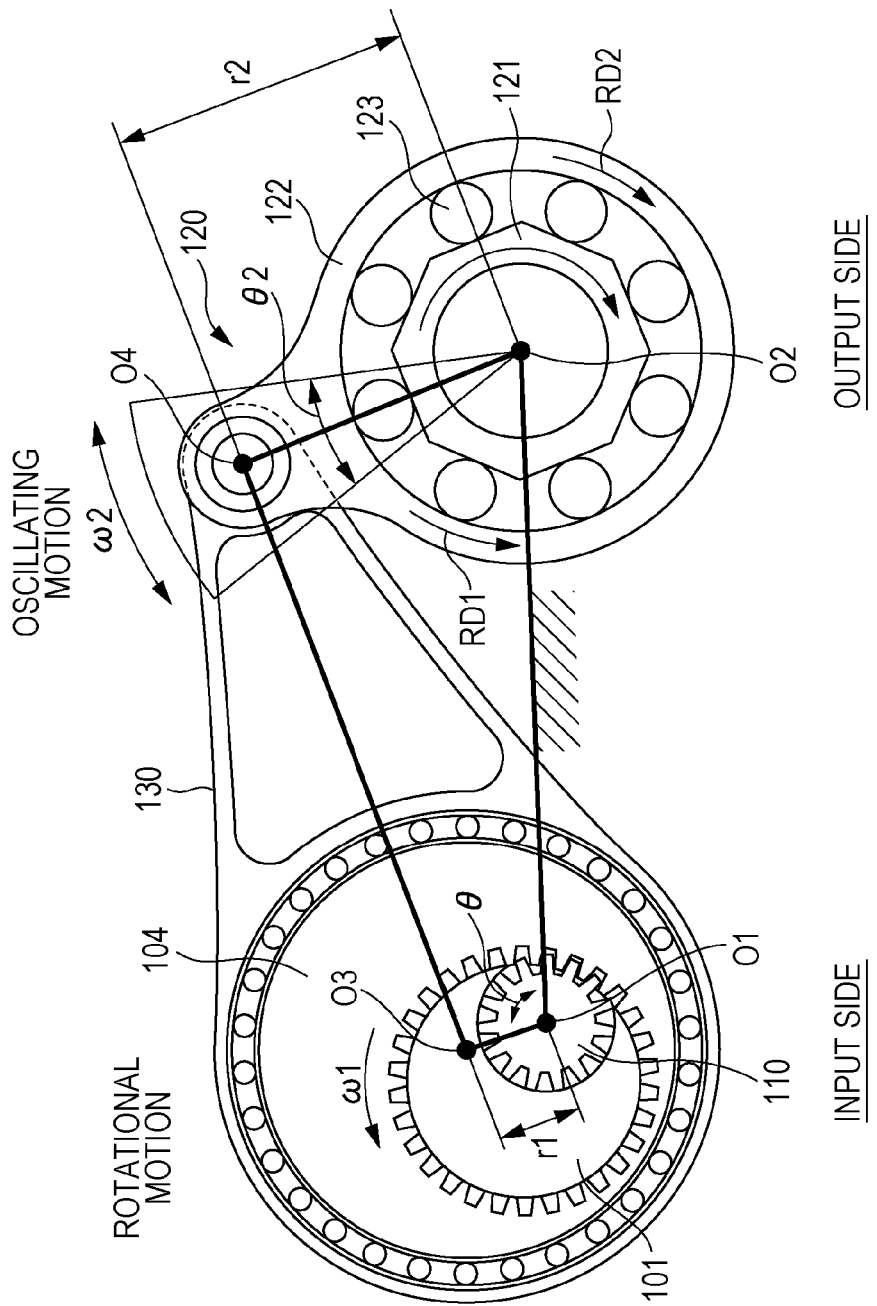
FIG. 7 is an explanatory diagram of the driving force transmission principle of a continuously variable transmission configured as a four-bar linkage mechanism.
Figure 9A:
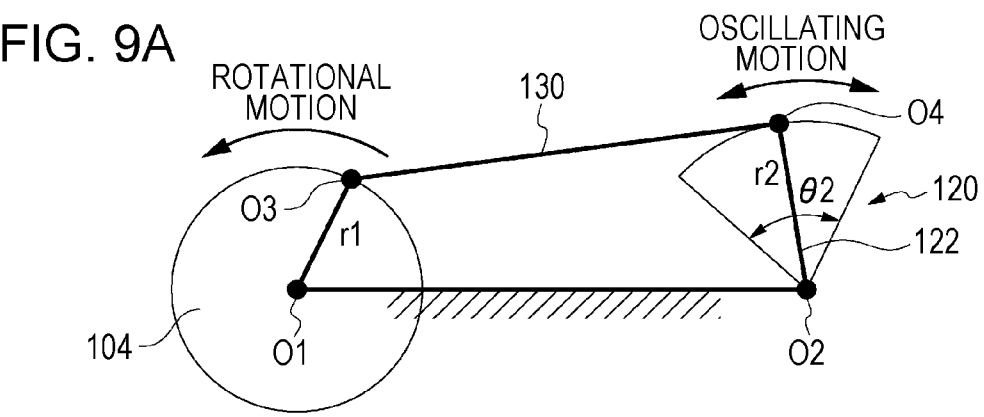
FIGS. 9A through 9C are explanatory diagrams of the principle of shifting with the variable gear ratio mechanism in the continuously variable transmission shown in FIG. 6.
Figure 9B:
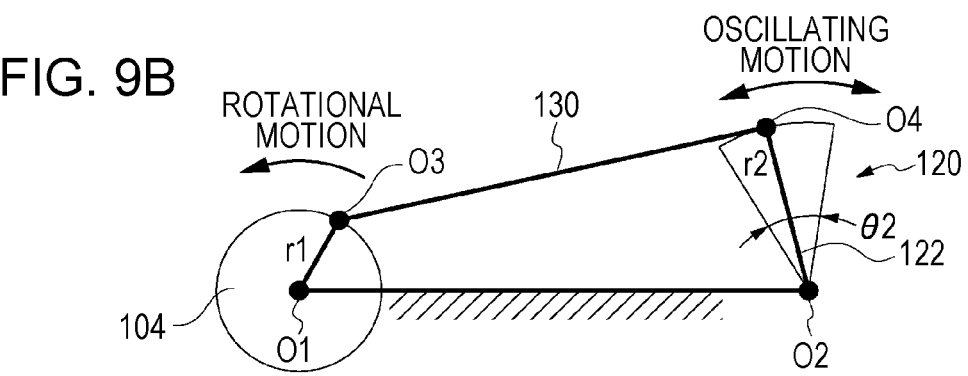
Figure 9C:
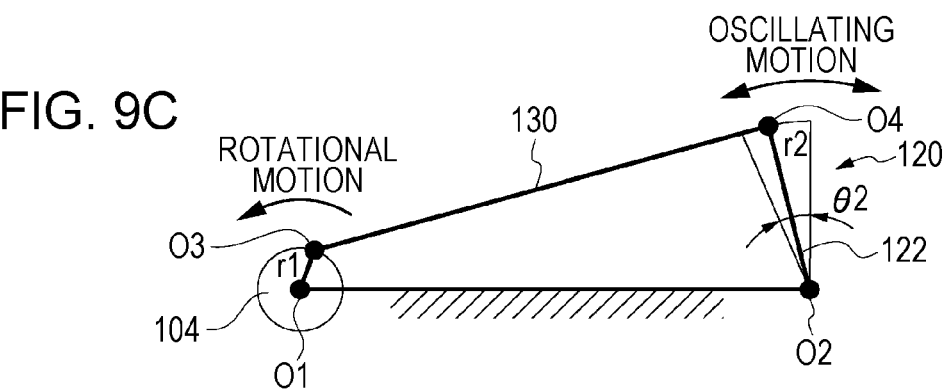
Figure 10:
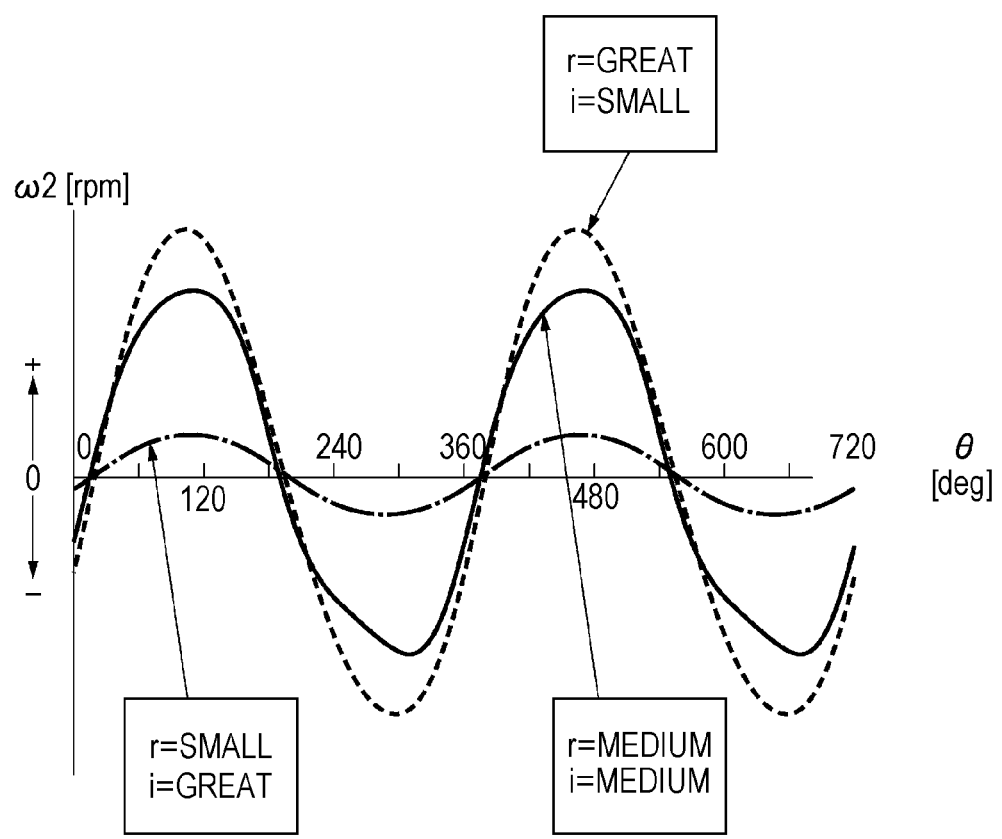
FIG. 10 is a diagram illustrating the relation between rotational angle of the input shaft and angular speed of the input member of the one-way clutch, in a case of varying the eccentricity of an eccentric disc rotating at the same speed with the input shaft between "great", "medium", and "small", with the continuously variable transmission shown in FIG. 6.
Figure 11:
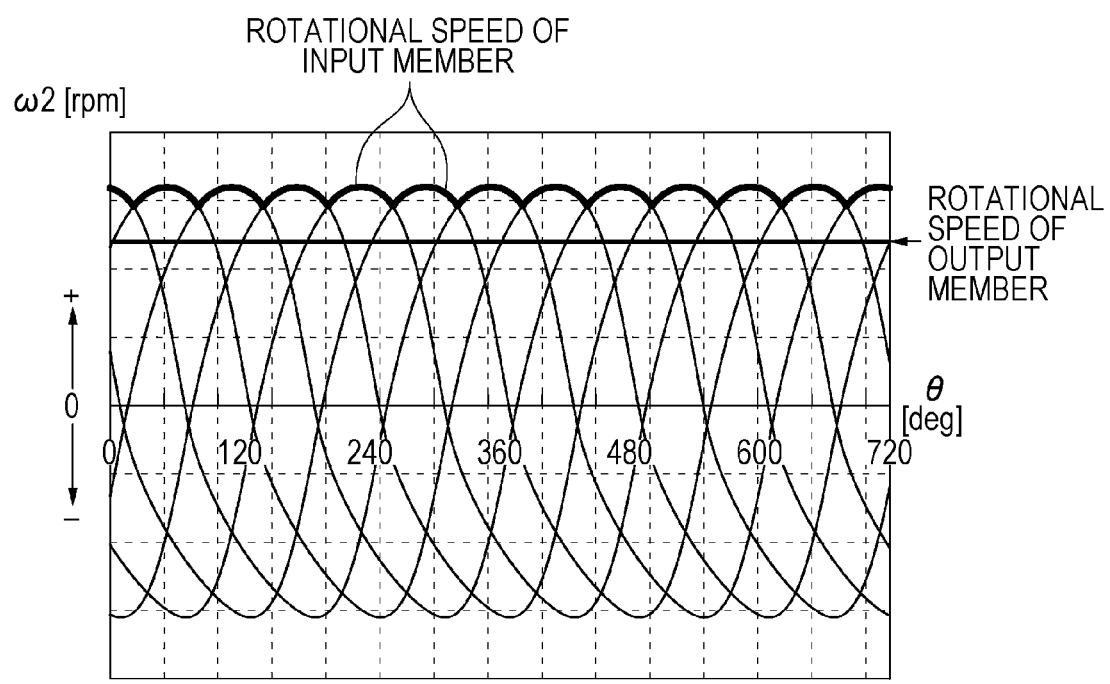
FIG. 11 is a diagram for describing a principle of obtaining output when power is transmitted from the input side (input shaft and eccentric disc) to the output side (output member of the one-way clutch) by multiple link members, with the continuously variable transmission shown in FIG. 6.

Next, the operations of the management ECU 217 with normal start control will be described. This is a description of conventional art, but will be made with reference to FIGS. 3 and 5 for the sake of comparison with the present embodiment. FIG. 5 is a flowchart illustrating the operations of the management ECU 217 for normal start control of the internal combustion engine 203.

As shown in FIG. 5, in step S301 the management ECU 217 determines whether or not the gear ratio i at the BD 205 is infinity (∞), and in the event that the gear ratio i is not infinity the flow proceeds to step S303, and otherwise to step S305.

In step S303, the management ECU 217 adjusts the eccentricity r1 such that the gear ratio i is infinity.

In step S305, the management ECU 217 performs start control of the internal combustion engine 203.

Next, in step S307, the management ECU 217 determines whether or not starting of the internal combustion engine 203 has completed, in accordance with whether or not the revolutions Ne of the internal combustion engine 203 have reached the idling revolutions Nei. Once the revolutions Ne of the internal combustion engine 203 reach the idling revolutions Nei in step S307, the management ECU 217 determines that starting of the internal combustion engine 203 has completed, and the flow advances to step S309.

In step S309, the management ECU 217 controls the internal combustion engine 203 such that the revolutions Ne of the internal combustion engine 203 are target revolutions Net according to the requested output, and also adjusts the eccentricity r1 such that the gear ratio i approaches the target value.

Thus, with the present embodiment, at the time of starting the internal combustion engine 203 while the EV driving of the vehicle, control of the gear ratio i at the BD 205 and control to raise the revolutions Ne of the internal combustion engine 203 up to the target revolutions Net are performed in parallel under high-response start control. Note that adjustment of the eccentricity r1 up to the gear ratio i reaching the target value is performed until the revolutions Ne of the internal combustion engine 203 reach the target revolutions Net. That is to say, the BD 205 is controlled such that the gear ratio i reaches the target value by the time that the revolutions Ne of the internal combustion engine 203 reach the target revolutions Net.

Accordingly, as shown in FIG. 3, while the timing at which the driving force from the internal combustion engine 203 is transmitted to the vehicle axles 221L and 221R (power transmission timing) is time t2 with normal start control, but is an earlier time t1 with high-response start control. Note that with the gear ratio control device according to the present embodiment using the BD 205, the timing at which the driving force from the internal combustion engine 203 is transmitted to the vehicle axles 221L and 221R is when the positive rotational speed of the input member 122 of the one-way clutch 120 of the BD 205 exceeds the positive rotational speed of the output member 121. In FIG. 3, the positive rotational speed of the output member 121 is denoted as "output rotational speed".

Now, while the vehicle in which the gear ratio control device is installed has been described as being a parallel type HEV with the present embodiment, application thereof is not restricted to the vehicle in the present embodiment. For example, this gear ratio control device may be applied to vehicles which only have internal combustion engines as the driving source, or to vehicles which have multiple internal combustion engines in addition to one or more electric motors as the driving source. Note that in the case of vehicles which only have internal combustion engines as the driving source, "EV driving" in the above description should be read as "coasting".

Also, with the present embodiment, high-response start control is performed in the event that the power priority mode has been selected, as shown in step S103 in FIG. 2. However, in the event that the vehicle has not been provided with the power priority mode, upon ending step S101 the management ECU 217 skips step S103 and advances to step S105. Also, in the event that the management ECU 217 determines that the mode selected by the mode selecting unit 215 in step S103 is not the power priority mode, i.e., is the normal drive mode, the flow may skip step S105 and advance to step S109.

The gear ratio control device (e.g., management ECU 217 in the embodiment) according to the embodiment is to control gear ratio in a vehicle having a four-bar linkage mechanism type continuously variable transmission (e.g., continuously variable transmission (BD) 205 in the embodiment) which includes an input shaft (e.g., input shaft 101 in the embodiment) configured to rotate on an input center axial line (e.g., input center axial line O1 in the embodiment) by receiving rotational force from a power source (e.g., internal combustion engine 203 in the embodiment), eccentric discs (e.g., eccentric discs 104 in the embodiment), which each have a first supporting point (e.g., first supporting point O3 in the embodiment) of which eccentricity (e.g., eccentricity r1 in the embodiment) as to the input center axial line is changeable as the center thereof, and configured to rotate around the input center axial line while maintaining the eccentricity, a one-way clutch (e.g., one-way clutch 120 in the embodiment) including an output member (e.g., output member 121 in the embodiment) configured to rotate around an output center axial line (e.g., center axial line O2 in the embodiment) which is distanced from the input center axial line, an input member (e.g., input member 122 in the embodiment) configured to oscillate around the output center axial line by receiving external rotational force, and an engaging member (e.g., roller 123 in the embodiment) configured to place the input member and the output member into a mutually locked state or unlocked state, configured such that, in the event that positive rotational speed of the input member exceeds the positive rotational speed of the output member, the rotational force input to the input member is transmitted to the output member, thereby converting oscillating motion of the input member into rotational motion of the output member, linking members (e.g., linking member 130 in the embodiment) rotatably linked at one end thereof to the perimeter of the eccentric discs centered on the first supporting points, and the other end rotatably linked to a second supporting point (e.g., second supporting point O4 in the embodiment) provided on the input member of the one-way clutch at a position distanced from the output center axial line, such that rotational motion provided from the input shaft to the eccentric discs is transmitted to the input member of the one-way clutch as oscillating motion of the input member, and a variable gear ratio mechanism (e.g., variable gear ratio mechanism 112 in the embodiment) including an actuator configured to change the oscillation angle of oscillating motion transmitted from the eccentric discs to the input member of the one-way clutch by adjusting the eccentricity of the first supporting points as to the input center axial line, thereby changing the gear ratio at the time of the rotational force input to the input shaft being transmitted as rotational force to the output member of the one-way clutch via the eccentric discs and the linking members, the variable gear ratio mechanism being configured such that the eccentricity can be set to zero, thereby enabling the gear ratio to be set to infinity; in the event of starting the power source in a state in which the power source is stopped and the vehicle is traveling, the eccentricity is adjusted such that the gear ratio at the continuously variable transmission is at a target value, in parallel with performing start control of the power source.

The gear ratio control method according to the embodiment is to control gear ratio in a vehicle having a four-bar linkage mechanism type continuously variable transmission (e.g., continuously variable transmission (BD) 205 in the embodiment) which includes an input shaft (e.g., input shaft 101 in the embodiment) configured to rotate on an input center axial line (e.g., input center axial line O1 in the embodiment) by receiving rotational force from a power source (e.g., internal combustion engine 203 in the embodiment), eccentric discs (e.g., eccentric discs 104 in the embodiment), which each have a first supporting point (e.g., first supporting point O3 in the embodiment) of which eccentricity (e.g., eccentricity r1 in the embodiment) as to the input center axial line is changeable as the center thereof, and configured to rotate around the input center axial line while maintaining the eccentricity, a one-way clutch (e.g., one-way clutch 120 in the embodiment) including an output member (e.g., output member 121 in the embodiment) configured to rotate around an output center axial line (e.g., center axial line O2 in the embodiment) which is distanced from the input center axial line, an input member (e.g., input member 122 in the embodiment) configured to oscillate around the output center axial line by receiving external rotational force, and an engaging member (e.g., roller 123 in the embodiment) configured to place the input member and the output member into a mutually locked state or unlocked state, configured such that, in the event that positive rotational speed of the input member exceeds the positive rotational speed of the output member, the rotational force input to the input member is transmitted to the output member, thereby converting oscillating motion of the input member into rotational motion of the output member, linking members (e.g., linking member 130 in the embodiment) rotatably linked at one end thereof to the perimeter of the eccentric discs centered on the first supporting points, and the other end rotatably linked to a second supporting point (e.g., second supporting point O4 in the embodiment) provided on the input member of the one-way clutch at a position distanced from the output center axial line, such that rotational motion provided from the input shaft to the eccentric discs is transmitted to the input member of the one-way clutch as oscillating motion of the input member, and a variable gear ratio mechanism (e.g., variable gear ratio mechanism 112 in the embodiment) including an actuator configured to change the oscillation angle of oscillating motion transmitted from the eccentric discs to the input member of the one-way clutch by adjusting the eccentricity of the first supporting points as to the input center axial line, thereby changing the gear ratio at the time of the rotational force input to the input shaft being transmitted as rotational force to the output member of the one-way clutch via the eccentric discs and the linking members, the variable gear ratio mechanism being configured such that the eccentricity can be set to zero, thereby enabling the gear ratio to be set to infinity; in the event of starting the power source in a state in which the power source is stopped and the vehicle is traveling, the eccentricity is adjusted such that the gear ratio at the continuously variable transmission is at a target value, in parallel with performing start control of the power source.

Two driving modes with different force capabilities may be provided as driving modes for the vehicle, such that when the mode with higher force capabilities is selected, in the event of starting the power source in a state in which the power source is stopped and the vehicle is traveling, the eccentricity is adjusted such that the gear ratio at the continuously variable transmission is at a target value, in parallel with performing start control of the power source. Thus, control of the gear ratio of the continuously variable transmission at the time of starting the power source can be changed in accordance with the driving mode of the vehicle.

When the mode with lower force capabilities is selected, in the event of starting the power source in a state in which the power source is stopped and the vehicle is traveling, the eccentricity may be adjusted such that the gear ratio at the continuously variable transmission is at a target value, in parallel with performing start control of the power source, if a requested output to the power source is equal to or greater than a predetermined value. Thus, control of the gear ratio of the continuously variable transmission at the time of starting the power source can be changed in accordance with the requested output of the power source.

In the event of starting the power source in a state in which the power source is stopped and the vehicle is traveling, the eccentricity may be adjusted such that the gear ratio at the continuously variable transmission is at a target value, in parallel with performing start control of the power source, if a requested output to the power source is equal to or greater than a predetermined value. Thus, control of the gear ratio of the continuously variable transmission at the time of starting the power source can be changed in accordance with the requested output of the power source.

The eccentricity may be adjusted such that the gear ratio reaches the target value before the revolutions of the power source reach the target revolutions.

According to the above-described configurations, the time until driving force from the power source is output from the continuously variable transmission can be reduced.

Obviously, numerous modifications and variations of the present invention are possible in light of the above teachings. It is therefore to be understood that within the scope of the appended claims, the invention may be practiced otherwise than as specifically described herein.

What is claimed is:
1. A gear ratio control device comprising:
a controller configured to control a gear ratio in a vehicle including a continuously variable transmission having a four-bar linkage mechanism, the continuously variable transmission including
an input shaft to rotate on an input center axial line by receiving rotational force from a power source,
eccentric discs each having a first supporting point of which eccentricity as to the input center axial line is changeable as a center of the eccentric disc, each of the eccentric discs being rotatable around the input center axial line while maintaining the eccentricity,
a one-way clutch including
an output member to rotate around an output center axial line which is distanced from the input center axial line,
an input member to oscillate around the output center axial line by receiving external rotational force, and
an engaging member to place the input member and the output member into a mutually locked state or unlocked state,
the one-way clutch being configured so that, in the event that a positive rotational speed of the input member exceeds a positive rotational speed of the output member, the rotational force input to the input member is transmitted to the output member, to convert oscillat- ing motion of the input member into a rotational motion of the output member, linking members each including
a first end rotatably linked to a perimeter of the eccentric disc centered on the first supporting point, and
a second end rotatably linked to a second supporting point provided on the input member of the one-way clutch at a position distanced from the output center axial line, so that rotational motion provided from the input shaft to the eccentric discs is transmitted to the input member of the one-way clutch as oscillating motion of the input member, and a variable gear ratio mechanism including
an actuator to change an oscillation angle of oscillating motion transmitted from the eccentric discs to the input member of the one-way clutch by adjusting the eccentricity of the first supporting points as to the input center axial line, the continuously variable transmission being provided to change the gear ratio at the time of the rotational force input to the input shaft being transmitted as rotational force to the output member of the one-way clutch via the eccentric discs and the linking members, the variable gear ratio mechanism being configured so that the eccentricity can be set to zero, to enable the gear ratio to be set to approach infinity, the controller being configured to start to adjust the eccentricity so that, in the event of starting the power source in a state in which the power source is stopped and the vehicle is traveling, the gear ratio at the continuously variable transmission is at a target value at the same time as performing start control of the power source, and the controller adjusts the eccentricity so that the gear ratio reaches the target value before revolutions of the power source reach target revolutions according to a requested output to the power source.

2. The gear ratio control device according to claim 1, wherein,
in the event of starting the power source in the state in which the power source is stopped and the vehicle is traveling, the controller adjusts the eccentricity so that the gear ratio at the continuously variable transmission is at the target value, in parallel with performing start control of the power source, if a requested output to the power source is equal to or greater than a predetermined value.

3. The gear ratio control device according to claim 1, wherein
first and second driving modes with different force capabilities are provided as driving modes for the vehicle, and
when the first driving mode with higher force capabilities is selected, in the event of starting the power source in the state in which the power source is stopped and the vehicle is traveling, the controller adjusts the eccentricity so that the gear ratio at the continuously variable transmission is at the target value, in parallel with performing start control of the power source.

4. The gear ratio control device according to claim 3, wherein
when the second driving mode with lower force capabilities is selected, in the event of starting the power source in the state in which the power source is stopped and the vehicle is traveling, the controller adjusts the eccentricity so that the gear ratio at the continuously variable transmission is at the target value, in parallel with performing start control of the power source, if a requested output to the power source is equal to or greater than a predetermined value.

5. A method for controlling a gear ratio in a vehicle including a continuously variable transmission having a four-bar linkage mechanism,
the continuously variable transmission including
an input shaft to rotate on an input center axial line by receiving rotational force from a power source,
eccentric discs each having a first supporting point of which eccentricity as to the input center axial line is changeable as a center of the eccentric disc, each of the eccentric discs being rotatable around the input center axial line while maintaining the eccentricity, a one-way clutch including
an output member to rotate around an output center axial line which is distanced from the input center axial line,
an input member oscillate around the output center axial line by receiving external rotational force, and
an engaging member to place the input member and the output member into a mutually locked state or unlocked state, the one-way clutch being configured so that, in the event that a positive rotational speed of the input member exceeds a positive rotational speed of the output member, the rotational force input to the input member is transmitted to the output member, to convert oscillating motion of the input member into a rotational motion of the output member, linking members each including
a first end rotatably linked to a perimeter of the eccentric disc centered on the first supporting point, and
a second end rotatably linked to a second supporting point provided on the input member of the one-way clutch at a position distanced from the output center axial line, so that rotational motion provided from the input shaft to the eccentric discs is transmitted to the input member of the one-way clutch as oscillating motion of the input member, and a variable gear ratio mechanism including
an actuator to change an oscillation angle of oscillating motion transmitted from the eccentric discs to the input member of the one-way clutch by adjusting the eccentricity of the first supporting points as to the input center axial line, the continuously variable transmission being provided to change the gear ratio at the time of the rotational force input to the input shaft being transmitted as rotational force to the output member of the one-way clutch via the eccentric discs and the linking members, the variable gear ratio mechanism being configured so that the eccentricity can be set to zero, to enable the gear ratio to be set to approach infinity, the method comprising:
starting to adjust the eccentricity so that, in the event of starting the power source in a state in which the power source is stopped and the vehicle is traveling, the gear ratio at the continuously variable transmission is at a target value, at the same time as performing start control of the power source, wherein
the eccentricity is adjusted so that the gear ratio reaches the target value before revolutions of the power source reach target revolutions according to a requested output to the power source.

6. The method according to claim 5, wherein,
in the event of starting the power source in a state in which the power source is stopped and the vehicle is traveling, the eccentricity is adjusted so that the gear ratio at the continuously variable transmission is at a target value, in parallel with performing start control of the power source, if a requested output to the power source is equal to or greater than a predetermined value.

7. The method according to claim 5, wherein
first and second driving modes with different force capabilities are provided as driving modes for the vehicle, and
when the first driving mode with higher force capabilities is selected, in the event of starting the power source in the state in which the power source is stopped and the vehicle is traveling, the eccentricity is adjusted so that the gear ratio at the continuously variable transmission is at the target value, in parallel with performing start control of the power source.

8. The method according to claim 7, wherein
when the second driving mode with lower force capabilities is selected, in the event of starting the power source in the state in which the power source is stopped and the vehicle is traveling, the eccentricity is adjusted so that the gear ratio at the continuously variable transmission is at the target value, in parallel with performing start control of the power source, if a requested output to the power source is equal to or greater than a predetermined value.

9. A vehicle comprising:
a continuously variable transmission having a four-bar linkage mechanism, the continuously variable transmission comprising:
  an input shaft to rotate on an input center axial line by receiving rotational force from a power source;
  eccentric discs each having a first supporting point of which eccentricity as to the input center axial line is changeable as a center of the eccentric disc, each of the eccentric discs being rotatable around the input center axial line while maintaining the eccentricity;
  a one-way clutch including
    an output member to rotate around an output center axial line which is distanced from the input center axial line,
    an input member to oscillate around the output center axial line by receiving external rotational force, and
    an engaging member to place the input member and the output member into a mutually locked state or unlocked state,
    the one-way clutch being configured so that, in the event that a positive rotational speed of the input member exceeds a positive rotational speed of the output member, the rotational force input to the input member is transmitted to the output member, to convert oscillating motion of the input member into a rotational motion of the output member;
  linking members each including
    a first end rotatably linked to a perimeter of the eccentric disc centered on the first supporting point, and
    a second end rotatably linked to a second supporting point provided on the input member of the one-way clutch at a position distanced from the output center axial line, so that rotational motion provided from the input shaft to the eccentric discs is transmitted to the input member of the one-way clutch as oscillating motion of the input member; and
  a variable gear ratio mechanism including
    an actuator to change an oscillation angle of oscillating motion transmitted from the eccentric discs to the input member of the one-way clutch by adjusting the eccentricity of the first supporting points as to the input center axial line,
  the continuously variable transmission being provided to change the gear ratio at the time of the rotational force input to the input shaft being transmitted as rotational force to the output member of the one-way clutch via the eccentric discs and the linking members; and
a gear ratio control device configured to control a gear ratio in the vehicle, the gear ratio control device being configured to start to adjust the eccentricity, in the event of starting the power source in a state in which the power source is stopped and the vehicle is traveling, so that the gear ratio at the continuously variable transmission is at a target value, at the same time as performing start control of the power source, and
the gear ratio control device adjusts the eccentricity so that the gear ratio reaches the target value before revolutions of the power source reach target revolutions according to a requested output to the power source.

10. The vehicle according to claim 9, wherein,
in the event of starting the power source in the state in which the power source is stopped and the vehicle is traveling, the gear ratio control device adjusts the eccentricity so that the gear ratio at the continuously variable transmission is at the target value, in parallel with performing start control of the power source, if a requested output to the power source is equal to or greater than a predetermined value.

11. The vehicle according to claim 9, wherein
first and second driving modes with different force capabilities are provided as driving modes for the vehicle, and
when the first driving mode with higher force capabilities is selected, in the event of starting the power source in the state in which the power source is stopped and the vehicle is traveling, the gear ratio control device adjusts the eccentricity so that the gear ratio at the continuously variable transmission is at the target value, in parallel with performing start control of the power source.

12. The vehicle according to claim 11, wherein
when the second driving mode with lower force capabilities is selected, in the event of starting the power source in the state in which the power source is stopped and the vehicle is traveling, the gear ratio control device adjusts the eccentricity so that the gear ratio at the continuously variable transmission is at the target value, in parallel with performing start control of the power source, if a requested output to the power source is equal to or greater than a predetermined value.

* * * * *